United States Patent [19]

Evans et al.

[11] 4,338,366

[45] Jul. 6, 1982

[54] SURFACE WIPING IMPLEMENT

[75] Inventors: Stephen F. Evans; Raymond J. Ludwa, both of Cincinnati, Ohio; Orn Adalsteinsson, Wilmington, Del.

[73] Assignee: The Procter & Gamble Company, Cincinnati, Ohio

[21] Appl. No.: 244,567

[22] Filed: Mar. 17, 1981

Related U.S. Application Data

[63] Continuation of Ser. No. 129,957, Mar. 13, 1980, abandoned, which is a continuation of Ser. No. 927,309, Jul. 24, 1978, abandoned, which is a continuation-in-part of Ser. No. 846,248, Oct. 28, 1977, abandoned.

[51] Int. Cl.³ .................. B32B 3/26; B32B 33/00; A47L 13/16
[52] U.S. Cl. .................. 428/76; 15/209 K; 15/209 B; 15/209 C; 428/158; 428/172; 428/212; 428/224; 428/304.4; 428/311.5; 428/332; 428/409
[58] Field of Search .......... 428/71, 76, 158, 172, 428/212, 310, 311, 314, 317, 376, 409, 224, 284, 332; 156/85; 15/209 R, 209 B, 209 C

[56] References Cited

U.S. PATENT DOCUMENTS

| | | | |
|---|---|---|---|
| 467,624 | 1/1892 | Smith . | |
| 2,942,285 | 6/1960 | Gray | 15/209 B |
| 3,083,392 | 4/1963 | Sewell | 15/118 |
| 3,144,671 | 8/1964 | Gould et al. | 15/1.5 |
| 3,252,176 | 5/1966 | Gropper et al. | 15/209 |
| 3,377,643 | 4/1968 | Teng et al. | 15/118 |
| 3,533,126 | 10/1970 | Ramos | 15/209 |
| 3,556,918 | 1/1977 | Lemelson | 161/55 |
| 3,597,299 | 7/1971 | Thomas et al. | 161/57 |
| 3,687,797 | 8/1972 | Wideman | 161/129 |
| 3,732,652 | 5/1973 | Furgal et al. | 51/401 |
| 3,929,135 | 12/1975 | Thompson | 128/287 |
| 4,069,366 | 1/1978 | Hoey | 428/310 |
| 4,082,878 | 4/1978 | Boe | 428/195 |

FOREIGN PATENT DOCUMENTS

| | | | |
|---|---|---|---|
| 525759 | 1/1954 | Belgium . | |
| 528393 | 3/1957 | Belgium . | |
| 736904 | 7/1943 | Fed. Rep. of Germany . | |
| 1503736 | 7/1969 | Fed. Rep. of Germany . | |
| 1489354 | 6/1967 | France . | |
| 2194569 | 3/1974 | France . | |
| 945636 | 1/1964 | United Kingdom | 15/118 |
| 1092902 | 7/1964 | United Kingdom . | |
| 1417293 | 12/1975 | United Kingdom . | |
| 1431775 | 4/1976 | United Kingdom . | |

*Primary Examiner*—Paul J. Thibodeau
*Attorney, Agent, or Firm*—Richard C. Witte; John M. Pollaro; Leonard Williamson

[57] ABSTRACT

A surface wiping implement is disclosed which is capable of effectively drying a surface. The surface wiping implement has an absorbent core encased in a non-collapsible cloth-like outer layer. The porosity, thickness, and liquid retention characteristics of the outer layer permit rapid penetration of primary drops of liquid into the absorbent core, while secondary drops of liquid are strongly attracted to and held at the interstices of the outer layer. The combined effects of the core and the outer layer remove liquid from the surface and prevent a redepositing of the removed liquid, thus permitting the surface wiping implement to remove all but the very small droplets of liquid which will evaporate in 15 seconds or less without spotting, streaking, or filming the surface.

12 Claims, 6 Drawing Figures

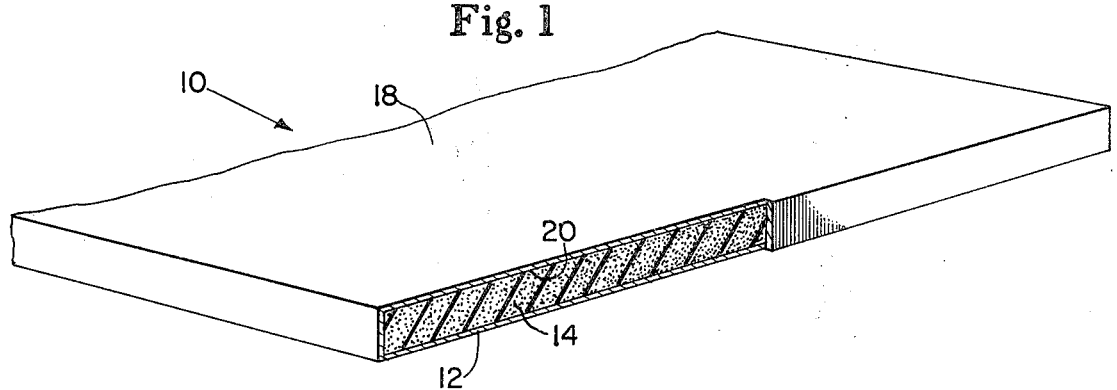
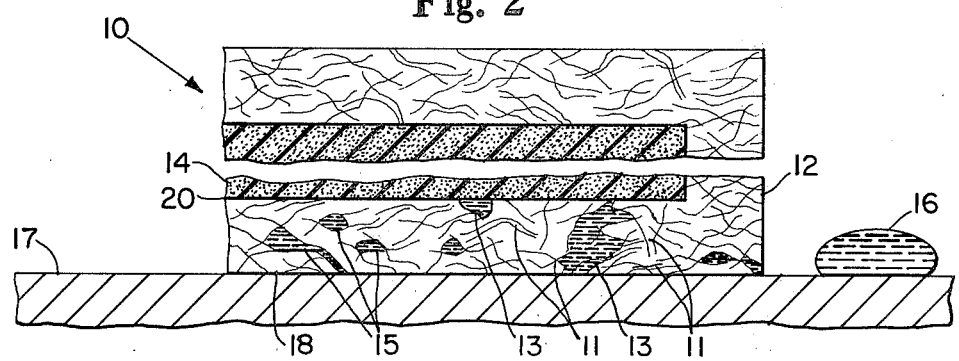
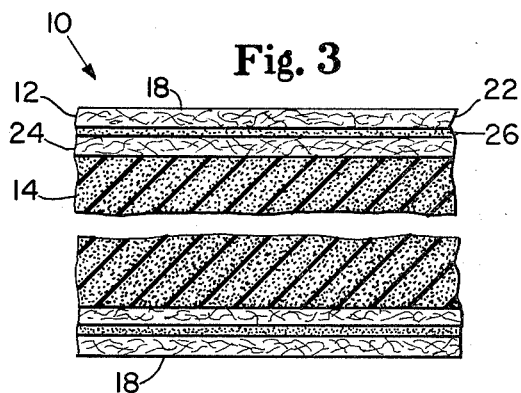
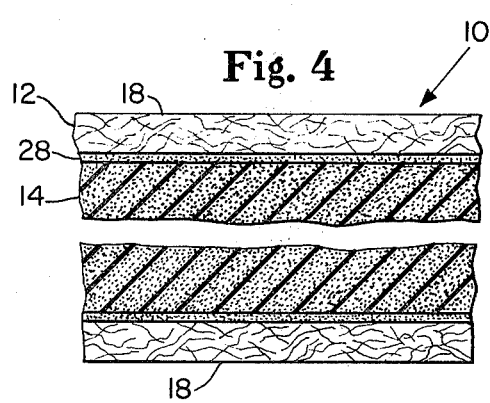
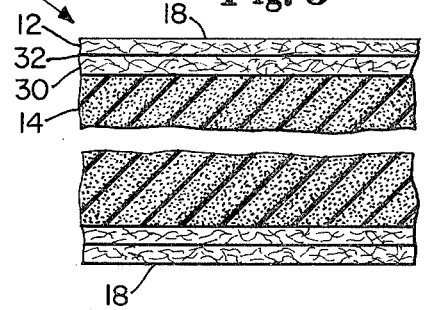

SURFACE WIPING IMPLEMENT

DESCRIPTION

CROSS-REFERENCE TO RELATED APPLICATIONS

This is a continuation of application Ser. No. 129,957, filed Mar. 13, 1980, which in turn is a continuation of application Ser. No. 927,309, filed July 24, 1978 which was a continuation-in-part of application Ser. No. 846,248, filed Oct. 28, 1977, all entitled "SURFACE WIPING IMPLEMENT." Applications Ser. Nos. 129,957, 927,309 and 846,248 are now abandoned.

TECHNICAL FIELD

This invention relates generally to absorbent surface wiping implements and more particularly to surface wiping implements having a non-collapsible cloth-like outer layer and an absorbent core. Still more particularly, this invention relates to semi-disposable surface wiping implements which are capable of effectively drying a surface or other object.

Surface wiping implements are those implements which are pliant and which are intended to remove a spill or other accumulation of liquid from a surface such as walls, tables, floors, windows, countertops, or from other objects such as kitchen appliances, eating utensils and the like. Surface wiping implements may be durable (i.e., intended to be used indefinitely, such as sponges and dishcloths), disposable (i.e., intended for single use before being discarded, such as paper towels), or semi-disposable (i.e., intended to be used a limited number of times, greater than one, before being discarded). Durable and semi-disposable surface wiping implements and reusable and, as such, are capable of becoming saturated with liquid, being wrung out, and absorbing a relatively large volume of liquids on reuse. Wring-out is typically accomplished by manually squeezing or twisting the implement. Further, surface wiping implements may have structures which are unitary (i.e., a single layer), layered (i.e., two or more unbonded layers having at least one interface), laminated (i.e., two or more layers having at least one commissure), or a combination of the layered and laminated constructions.

Irrespective of the construction, when using the prior are devices to remove an accumulation of liquid, it is difficult to completely dry the surface being wiped. In general, the prior art devices will rapidly absorb large accumulations of liquid from a surface but are unable to absorb the significant quantity of liquid that remains on the surface in the form of small drops. These small drops of liquid leave the surface wet and as they evaporate can streak, spot or film the surface.

BACKGROUND ART

Examples of absorbent wiping implements of interest are: U.S. Pat. No. 3,377,643 issued to J. Teng et al on Apr. 16, 1968; U.S. Pat. No. 3,687,797 issued to R. H. Wideman on Aug. 29, 1972; and U.S. Pat. No. 467,624 issued to F. E. Smith on Jan. 20, 1892. These implements however, lack the aspects of the present invention wherein a surface wiping implement has a core which absorbs primary drops of liquid and a non-collapsible cloth-like outer layer, the interstices of which attract and retain secondary drops of liquid. The combined effect of the core and outer layer is to remove liquid from the surface being wiped and to prevent redeposition, under normal wiping pressure, of that liquid onto the surface. The surface is thereby rendered effectively dry. By definition, a surface is considered effectively dry when the liquid remaining on the surface is in the form of very small droplets which will evaporate in less than 15 seconds without spotting, streaking, or filming the surface.

It is, therefore, an object of the present invention to provide a surface wiping implement capable of rendering a surface effectively dry.

It is an additional object of the present invention to provide a surface wiping implement having an absorbent core and a non-collapsible cloth-like outer layer.

It is a further object of the present invention to provide a surface wiping implement having an outer layer with a combination of porosity, thickness, and liquid retention characteristics which will permit the passage of primary drops of liquid through to the absorbent core while attracting and retaining secondary drops of liquid.

These and other objects of the present invention will be readily apparent when considered in reference to the following description and claims and when taken in connection with the attached drawings in which they relate.

DISCLOSURE OF THE INVENTION

According to the present invention, a surface wiping implement has an absorbent core encased in a non-collapsible cloth-like outer layer. The physical characteristics of the outer layer promote the rapid passage of primary drops of liquid while attracting and retaining secondary liquid drops. Primary liquid drops are those accumulations of liquid, the tops of which contact the absorbent core, thereby forming a liquid continuum between the absorbent core and the bottom of the liquid accumulation. The formation of such a liquid continuum causes the primary liquid drop to be rapidly transported to the abdorbent core. The bottom of the large liquid drop may be in contact with the surface being wiped or it may be at the interstices of the outer layer. Secondary drops of liquid are those accumulations of liquid which do not form a continuum with the absorbent core but which are attracted to and held at the interstices of the outer layer.

By removing both primary and secondary liquid drops from a surface, the surface wiping implement of the present invention can leave the surface effectively dry. A surface is effectively dry when the liquid remaining on the surface is in the form of very small droplets which will evaporate in less than 15 seconds without spotting, streaking, or filming the surface. These droplets are neither primary drops (i.e., they do not contact the absorbent core) nor secondary drops (i.e., they are not attracted to the interstices of the outer layer).

The ability of a surface wiping implement to effectively dry a surface is indicated by the liquid removal index of the outer layer. The liquid removal index defines the interrelationship between the thickness, porosity, and liquid retaining capacity of the outer layer which is necessary to enable the outer layer to effectively dry a surface. For example, as the thickness of the outer layer increases, the ability to form a liquid continuum between the surface being wiped and the absorbent core decreases while a high degree of porosity increases the ease with which a continuum is formed. An outer layer which is too thin or too porous, however, will permit the absorbent core to contact, and thus rewet, the surface being wiped. Further, an outer layer which is an open, porous structure might not have sufficient interstitial attraction to attract and retain secondary liquid drops; but, a closed, non-porous structure will act as a liquid barrier restricting flow of liquid between the absorbent core and the surface being wiped. Still further, an outer layer which has too great an affinity for liquids will become saturated and thus redeposit liquid on the surface being wiped. The liquid removal index of the outer layer is chosen so that liquid will be removed from the surface and once removed will not be redeposited under normal wiping pressure.

BRIEF DESCRIPTION OF THE DRAWINGS

FIG. 1 is a cut away perspective view of the surface wiping implement of the present invention.

FIG. 2 is a greatly enlarged cutaway side view of the surface wiping implement of the present invention.

FIG. 3 is a cutaway side view of an alternative embodiment of the present invention having a laminated covering.

FIG. 4 is a cutaway side view of an alternative embodiment of the present invention having the outer layer laminated to the absorbent core.

FIG. 5 is a cutaway side view of an alternative embodiment of the present invention having an intermediate layer.

BEST MODE FOR CARRYING OUT THE INVENTION

Figure 6:
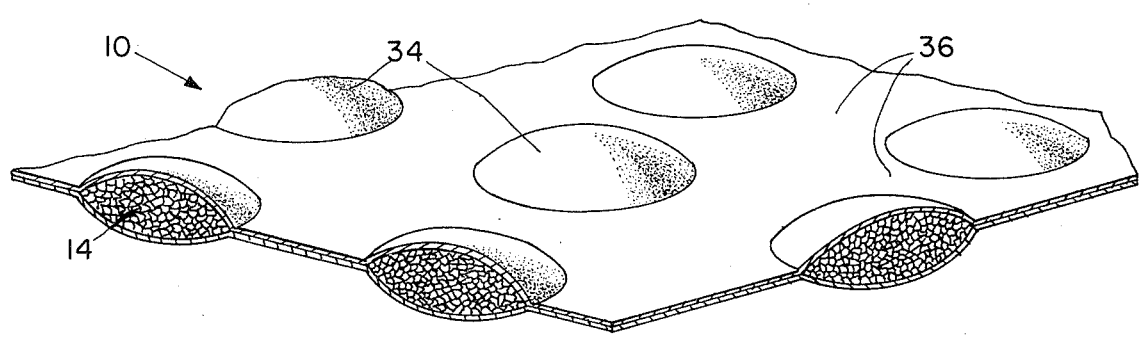
FIG. 6 is a partially cutaway perspective view of an alternative embodiment of the present invention having a plurality of compartments.

Referring now to FIG. 1, there is shown a preferred embodiment of the present invention. As seen in FIG. 1, the surface wiping implement 10 of the present invention is a layered structure basically comprising an outer layer 12 and an absorbent core 14.

Surface wiping implement 10 may be manufactured in a wide variety of shapes and sizes. For example, surface wiping implement 10 may be manufactured in the shape of a hand, or in the shape of circular or rectangular pads. Preferably, surface wiping implement 10 is formed into a sheetlike configuration approximately 11 inches by 9 inches (28 cm by 23 cm). Additionally, surface wiping implement 10 may have a structure which is layered, laminated, or layered and laminated in combination as hereinbefore described.

Absorbent core 14 may be any suitable liquid absorbent material which is capable of absorbing at least 100 grams of water per 25 grams of absorbent material as determined using the following procedure. A rectangular parallelepiped apparatus having a 4 inch by 4 inch base (10 cm by 10 cm) is loaded with 25 grams of the absorbent material and weighed. The apparatus is filled with water and the excess water allowed to drain through perforations in the bottom face of the apparatus. The apparatus is again weighed and the difference between the starting weight and the final weight of the apparatus is the weight of water absorbed.

Further, the absorbent core material must be able to wick liquids, thereby distributing absorbed liquids throughout absorbent core 14. The wicking rate of the absorbent core material has an important impact on the ability of surface wiping implement 10 to effectively dry a surface. The wicking rate of the absorbent core material may be determined using the following procedure. A rectangular parallelepiped having a base 1 inch wide by 5 inches long (2.5 cm × 12.7 cm) is loaded with 0.45 grams of the absorbent core material, which material is evenly distributed to a uniform thickness when placed in the rectangular parallelepiped. Water is introduced across the width of the rectangular parallelepiped while the time required for the water to travel 5 inches (12.7 cm) is recorded. The water is at essentially zero pressure when in contacts the absorbent material. To be satisfactory, the absorbent core material must transport water over the 5 inch (12.7 cm) length in less than 60 seconds and preferably less than 30 seconds.

Still further, absorbent core 14 must be able to absorb liquid, release some or most of the absorbed liquid when compressed manually, and still be capable of absorbing additional liquid when used again. This ability to absorb liquid after having been wrung out is particularly important when the quantity of liquid to be absorbed from a surface is greater than the capacity of absorbent core 14.

As used herein, the term liquid refers to water and aqueous solutions.

Preferably, absorbent core 14 is soft and pliant conforming readily to the configuration of the surface being wiped. Another desirable, though not necessary, feature of absorbent core 14 is bulkiness when both wet and dry. Examples of materials suitable for use as absorbent core 14 are natural sponges, polyester foams, polyurethane foams, cellulose, and absorbent arrays of synthetic fibers such as fiber glass or polyester. For the preferred embodiment, hydrophilic polyurethane form is used in sheet form although foam particles may also be used.

Outer layer 12 overlays at least one outer surface of absorbent core 14 and preferably encases and is in intimate contact with absorbent core 14 forming interface 20. Outer layer 12 is a non-collapsible web having a flexible, cloth-like configuration which allows surface drying implement 10 to conform readily to the surface being wiped and, further, has wiping faces 18 (one shown in FIG. 1) which are wiped over the surface (not shown in FIG. 1) to be dried. In the preferred embodiment, outer layer 12 extends inward from wiping face 18 of surface wiping implement 10 to interface 20.

As used herein, the term non-collapsible refers to outer layers 12 having a caliper loss of less than 45%. The caliper loss is determined using the following equation:

$$\text{caliper loss} = \frac{C_1 - C_2}{C_1} \times 100$$

where:

$C_1$ = the caliper of the web under a pressure of 0.175 pounds per square inch (1.21 kilopascals)

$C_2$ = the caliper of the web under a pressure of 1 pound per square inch (7 kilopascals)

Calipers $C_1$ and $C_2$ may be determined using any standard method as hereinafter detailed. $C_2$ is measured at 1 pound per square inch (7 kilopascals) to ensure that the web is fully compressed and $C_1$ is measured at 0.175 pounds per square inch (1.21 kilopascals) to ensure that the minor loft and bulkiness caused by a small number of outwardly projecting fibers is eliminated.

As used herein, the term cloth-like refers to webs having the general appearance and characteristics (e.g., hand and drape) of cloth.

A wide variety of materials and manufacturing techniques may be used to manufacture outer layer 12. For example, outer layer 12 may be made from natural fibers such as raw silk; from synthetic fibers such as polypropylene; or from thermoplastic materials such as polyethylene. Further, outer layer 12 may be woven, nonwoven, knitted, or formed from a thermoplastic film. Preferably outer layer 12 is a non-woven fabric made from polypropylene fibers.

Outer layer 12 and absorbent core 14 may be combined using any one of a number of methods which will suggest themselves to one skilled in the art. For example, outer layer 12 may be formed in the shape of a pocket, the open end of which is sealed by an appropriate method, such as by sewing, ultrasonic bonding, or gluing. In the preferred embodiment, ultrasonic bonding, as is well known in the art, was used to seal outer layer 12.

Referring now to FIG. 2, it will be understood that outer layer 12 is a non-collapsible cloth-like web and must have a combination of thickness, porosity, and liquid retention characteristics which when taken together promote rapid transport of primary drops of liquid 13, attract and retain secondary liquid drops 15 at interstices 11, and prevents absorbent core 14 from contacting the surface 17 being wiped.

As used herein, the term "interstices" refers to those portions of outer layer 12 which exhibit a locally high affinity for liquids. Interstices 11 may occur at points where individual fibers cross or are in close proximity in woven and non-woven outer layers 12 or near perforation openings in formed or perforated thermoplastic films.

For a surface wiping implement to effectively dry a surface, it must remove enough liquid from the surface so that the remaining liquid will evaporate in less than 15 seconds without spotting, streaking, or filming the surface. The ability of a surface wiping implement 10 to effectively dry a surface is indicated by the liquid removal index of outer layer 12. The liquid removal index is determined by the following equation:

$$LRI = P \times T/R$$

where:
LRI = liquid removal index
P = the porosity index (dimensionless fraction)
T = the thickness of the outer layer (mils)
R = the liquid retained by the outer layer (gm)

The porosity index (P) is the area of the outer layer 12 which is open to the passage of liquid expressed as a fraction of the total area of outer layer 12 and is determined using the simple photographic techniques now to be described.

A two inch square sample of the material from which outer layer 12 is manufactured is mounted in a standard 35 mm photographic glass slide mount. The sample chosen should be representative of the porosity of outer layer 12. If the porosity of the material from which outer layer 12 is manufactured cannot be represented by a single sample, the following procedure can be repeated for several samples and the results averaged. The outer layer 12, however, must not have pores which are so large that the absorbent core 14 touches the surface being wiped.

The photographic slide holder containing the sample is inserted in a slide projector and projected onto a conventional viewing screen. While any conventional slide projector may be used, Ektagraphic Model AF2 as manufactured by the Kodak Corporation of Rochester, N.Y. was used with satisfactory results. The projector is aimed at the center of the viewing screen and is placed at a distance of approximately 118 inches (300 cm) perpendicularly from the viewing screen. The projector is vertically centered on the viewing screen and is displaced along the horizontal centerline of the viewing screen approximately a distance of 29 inches (74 cm) from the center of the viewing screen.

The projected image is photographed using any suitable camera. For example, a one second time exposure taken at an f stop of eight with a model MP4 camera as manufactured by the Polaroid Corporation of Cambridge, Mass. was used with good results. The camera used had a 135 mm lens (f:4.5) and a bellows extending 11.8 cm and was used with type 55PN film as manufactured by the Polaroid Corporation. The camera was placed at a distance of approximately 36 inches (91 cm) perpendicularly from the viewing screen. The camera is vertically centered on the viewing screen and is displaced along the horizontal centerline of the viewing screen approximately a distance 6 inches (15 cm) from the center of the viewing screen. The projector and the camera are on opposite sides of the vertical centerline of the viewing screen.

In the photograph of the projected sample the open area in the material will appear as light areas while the solid portions of the material will appear dark. The fraction of the outer layer which is open area is determined by finding the fraction of light areas on the photograph. A Color Difference Meter such as Model D25D2 with a model D25D2 optical head as manufactured by Hunter Associates Laboratories, Inc. of Fairfax, Va. may be used to determine the percentage of light area. For purposes of calibration, one photograph is taken of the projection of a transparent slide and one photograph is taken of the projection of an opaque slide. The transparent slide represents a material which is infinitely open to the passage of liquids and the color meter is set to read 100 for this slide indicating that all of the material is open to the passage of liquid. The opaque slide represents a material which is solid and the color meter is set to read zero for this slide indicating the material acts as a bar to the passage of liquids. Samples of materials from which outer 12 is manufactured will have meter readings between 0 and 100 which indicate the percentage of outer layer 12 which is open to the passage of liquids. The percentage of open area is converted to a fraction for use in the determination of the liquid removal index.

The accuracy of the above described procedure may be increased to enhancing the contrast between the light and dark areas of the photograph. A contrast enhancing procedure may be necessary to get a representative porosity index, particularly for thin translucent perforated plastic films. The contrast between light and dark areas can be intensified, for example, by using a lens filter such as the Green High Contrast Filter No. 563156 as manufactured by Schott Glasse Werks of Mainz, West Germany placed between the projector bulb and the sample.

Methods of determining the porosity index other than as specifically described will suggest themselves to one skilled in the art. These other methods may be used so long as they give a true representation of the percentage of open area for the material used to manufacture outer layer 12.

The thickness or caliper of the sample is determined under a pressure of about 0.175 pounds per square inch (1.21 kilo pascals) and can be measured using any of the well known techniques. For example, a standard caliper meter may be used. A suitable meter is manufactured by Testing Machines Inc. of Amityville, N.Y. and marketed under the name Precision Micrometer Series 400 Tester Model 449-27-3. Thickness is determined under a load of 0.175 pounds per square inch (1.21 kilo pascals) to ensure that the caliper meter readings are not distorted by a small number of upwardly projecting protuberances.

The liquid retained by the outer layer may also be determined using simple techniques. For example, two absorbent cores each with a wiping face 7 cm square and which will absorb at least about 35 gms of liquid and which have a wicking rate of at most about 30 seconds as determined using the procedures hereinbefore described are preweighed and one of them is wrapped in an eight inch (20 cm) square section of outer layer 12 having an area of 49 sq cm in contact with the surface being wiped. An acceptable absorbent core for this test is a folded 11 inch square (28 cm) sheet of paper toweling. A suitable paper towel is manufactured by The Procter & Gamble Paper Products Company of Cincinnati, Ohio and marketed under the tradename BOUNTY. The wrapped core is used to wipe a smooth surface, such as plexiglass or formica, having a 10 gm accumulation of water, for 300 seconds at a rate of 10 inches (25.4 cm) per second. The second preweighed core (not wrapped) is used to absorb the water remaining on the surface, if any, and both absorbent cores are then reweighed. The difference between the original weight and final weight of the absorbent cores is the weight of water absorbed by the core. The difference between the weight of a 10 gm spill and the weight of water absorbed by the core is the amount of water retained by the outer layer. As with all the wiping tests described herein, the foregoing process is carried out at 75° F. and at a relative humidity of 50% to standardize evaporation.

The time required for surface wiping implement 10 to effectively dry a surface will depend in part upon the quantity of liquid to be removed. If the accumulation of liquid exceeds the task completion volume of surface wiping implement 10, as hereinafter defined, the surface wiping implement 10 will have to be wrung out and reused before the surface can be effectively dried. However, once the liquid accumulation remaining on the surface has been reduced to less than the task completion volume of surface wiping implement 10, the wrung-out implement 10 having outer layers 12 with a liquid removal index of at least 8, and preferably from about 30 to about 50 will render a surface effectively dry in less than about 300 seconds of wiping time and preferably in less than about 150 seconds of wiping time and most preferably in less than about 100 seconds of wiping time.

The data listed in Tables I and II demonstrate that surface wiping implements 10 having an outer layer with a liquid removal index within the above specified ranges are capable of rendering a surface effectively dry rapidly and efficiently.

The data in Table I was generated in general accordance with the wiping test procedures hereinbefore described with respect to the determination of the amount of liquid retained by the outer layer. Briefly, the procedure involved wiping a plexiglass surface having a 10 ml accumulation of water for 300 seconds or until the surface was effectively dry with the encased absorbent core described above. The data in Table II was similarly generated except that the quantity of the water accumulation was varied to determine the maximum volume of water that could be removed from a surface and still leave the surface effectively dry. This volume of water is the task completion volume.

TABLE I

Relationship Between Ability to Effectively Dry A Surface and Liquid Removal Index

| Sample[1] | Outer Layer Description | | |
|---|---|---|---|
| | Material | Construction | Example |
| A[2] | Not applicable | Not applicable | Not applicable |
| B | Cotton fibers | Woven fabric | Dish cloth as mfg. by the Leshner Co. of St. Mary, Ohio |
| C | Polyester fibers (polyethylene terephtalate) | Non-woven fabric | Webril 1436 as mfg. by the Kendall Corp. of Boston, Mass. |
| D | Rayon fibers | Carded non-woven | IP Grade No. 2007001 as mfg. by Intern'l. Paper Co. of Tuxedo Park, N.Y. |
| E | Polypropylene fibers (1-2 denier non-abrasive) | Non-woven fabric | Lutravil as mfg. by Lutravil Spinnulies GmbH, Kaiserlautern, W. Germany |
| F | Polyethylene film | Apertured formed fabric | See U.S. Pat. No. 3,929,135 which is incorporated herein by reference |
| G | Polypropylene fibers (8-20 denier abrasive) | Non-woven fabric | Polyweb 07137-8 as mfg. by Reigel Products of Milford, N.J. |

| Sample | Liquid Removal Index | Effectively dries a Surface wetted with 10 ml of water in less than 300 sec. (yes/no)/time required to effectively dry the surface (sec.) |
|---|---|---|
| A | Not applicable | No |
| B | 0.89 | No |
| C | 1.79 | No |
| D | 10.71 | Yes/104 |
| E | 30.1 | Yes/66 |
| F | 44.1 | Yes/68 |
| G | 74.6 | Yes/137 |

Notes:
[1] All samples used an absorbent core which had a wiping face 7 cm square, a thickness sufficient to absorb at least 35 gms of water and a wicking rate of at most 30 seconds. The specific core used was a paper towel as hereinbefore described.
[2] Sample A was a paper towel core as described in note [1] above without an outer layer.
[3] The units for LRI are "mm/gm."

TABLE II

Relationship Between Liquid Removal Index and Task Completion Volume

| Sample[1] | Outer Layer Description | | |
|---|---|---|---|
| | Material | Construction | Example |
| A[2] | Not applicable | Not applicable | Not applicable |
| B | Cotton fibers | Woven fabric | Dish cloth as mfg. by the |

TABLE II-continued
Relationship Between Liquid Removal Index and Task Completion Volume

| | | | |
|---|---|---|---|
| C | Polyester fibers (polyethylene terephtalate) | Non-woven fabric | Leshner Co. of St. Mary, Ohio Webril 1436 as mfg. by the Kendall Corp. of Boston, Mass. |
| D | Rayon fibers | Carded non-woven | IP Grade No. 2007001 as mfg. by Intern'l. Paper Co. of Tuxedo Park, N.Y. |
| E | Polypropylene fibers (1-2 denier non-abrasive) | Non-woven fabric | Lutravil as mfg. by Lutravil Spinnulies GmbH, Kaiserlautern, W. Germany |
| F | Polyethylene film | Apertured formed fabric | See U.S. Pat. No. 3,929,135 which is incorporated herein by reference |
| G | Polypropylene fibers (8-20 denier abrasive) | Non-woven fabric | Polyweb 07137-8 as mfg. by Reigel Products of Milford, N.J. |

| Sample | Liquid Removal Index | Task Completion Volume (ml) |
|---|---|---|
| A | Not applicable | Less than 2 |
| B | 0.89 | 2 |
| C | 1.79 | 2 |
| D | 10.71 | 12 |
| E | 30.1 | 24 |
| F | 44.1 | 23 |
| G | 74.6 | 23 |

Notes:
(1) All samples used an absorbent core which had a wiping face 7 cm square, a thickness sufficient to absorb at least 35 gms of water and a wicking rate of at most 30 seconds. The specific core used was a paper towel as hereinbefore described.
(2) Sample A was a paper towel core as described in note (1) above without an outer layer.
(3) The units for LRI are "mm/gm".

As can be clearly seen from Table I, surface wiping implement 10 having no outer layer 12 (sample A) or having outer layers 12 with liquid removal indices of less than 8 (sample B and C) do not render the surface being wiped effectively dry without an excessive amount of wiping (more than 300 seconds) if at all. Outer layers 12, however, having a liquid removal index of at least 8 (samples D, E, F, and G) and preferably from about 25 to about 100 and most preferably from about 30 to about 50 are able to effectively dry a surface in less than 300 seconds. The absorptive capacity and wicking rate of absorbent core 14 can affect the performance of surface wiping implement 10, therefore, all samples in both Tables I and II had paper towel cores of the same capacity and wicking rate as hereinbefore specified (i.e., the ability to absorb at least about 35 gms of water with a wicking rate of at most about 30 seconds).

Surface wiping implement 10 having a liquid ramoval index of at least 8 will absorb a larger accumulation of liquid and still leave a surface effectively dry than will surface wiping implements 10 having liquid removal indices of less than 8. As seen in Table II, the samples in which there was no outer layer 12 (sample A) or in which outer layer 12 had a liquid removal index less than 8 (samples B and C) were able to remove only relatively small quantities of liquid when achieving an effectively dry surface as compared to samples wherein the outer layers 12 had a liquid removal index of at least 8 (samples D, E, F, and G).

While not wishing to be bound by any theoretical considerations, it is believed that the ability of outer layers 12 having liquid removal indices of at least 8 to effectively dry a surface can be described with reference to FIG. 2 as follows. A wiping implement 10 is wiped over surface 17, it will contact liquid accumulations 16 which are on surface 17. Liquid accumulation 16 will deform as it penetrates the voids of outer layer 12 until it contacts absorbent core 14, thereby forming primary drop 13. Liquid from primary drop 13 will flow into absorbent core 14 until the continuum is broken. The portion of primary drops 13 that is not absorbed by absorbent core 14 will form either secondary drops 15 which will be attracted to and retained by interstices 11 or tiny droplets (not shown) which will evaporate from surface 17 in less than about 15 seconds without streaking, spotting or staining the surface. Further, secondary drops 15 may accumulate at interstices 11 and form primary drops 13 as the wiping process is continued.

It will be understood that the foregoing description is of the preferred embodiment of the invention and is therefore merely representative. Obviously, there are many variations and modifications of the present invention in light of the preceeding teaching. As shown in FIG. 3, for example, surface wiping implement 10 may be encased in a covering 22 which is a laminate encasing absorbent core 14. Laminated covering 22 has an outer layer 12 and a backing layer 24 joined at commissure 26. The outer layer 12 extends from wiping face 18 to the commissure 26 between outer layer 12 and backing layer 24. The liquid removal index (LRI) of outer layer 12 is determined by cutting covering 22 along commissure 26, thereby separating outer layer 12 from backing layer 24. The outer layer 12 may then be subjected to the test procedures hereinbefore described. "Lamination" as used, herein, may be accomplished by any of the procedures as are well known in the art. For example, lamination may be achieved by heat bonding or by forming the layers one atop the other. Further, commissure 26 may be an intermittent or a continuous bond between the various layers.

Alternatively, surface wiping implement 10 itself may be a laminated structure. That is, the absorbent core 14 and outer layer 12 may be bonded together as shown along commissure 28 in FIG. 4. In this instance, outer layer 12 extends from wiping face 18 to commissure 28. To determine the liquid removal index (LRI) of outer layer 12 in this embodiment, outer layer 12 is separated from absorbent core 14 along commissure 28 and subjected to the hereinbefore described procedures. In another embodiment, outer layer 12 may be intermitently bonded to absorbent core 14.

Further, surface wiping implement 10 may be a layered structure as shown in FIG. 5 having an intermediate layer 30 interposed between outer layer 12 and absorbent core 14. The outer layer 12 in this alternative embodiment extends from wiping face 18 to the interface 32 with intermediate layer 30. The liquid removal index (LRI) of outer layer 12 in this embodiment is determined by separating outer layer 12 from intermediate layer 20 along interface 32 and subjecting outer layer 12 to the hereinbefore described procedures. Intermediate layer 30 may serve a variety of purposes such as to add tensile strength to surface wiping implement 10 or to improve lateral wicking of liquid that has passed through outer layer 12. A suitable intermediate layer 30 to improve wicking is a melt blown fabric of polypropylene fibers which are surfactant treated. A suitable surfactant is manufactured by Textilana Corporation of Hawthorne, Calif. and marketed under the tradename Velvetex BCW.

Sill further, surface wiping implement 10 may have a plurality of compartments 34 as shown in FIG. 6. Compartments 34 contain absorbent core 14 comprising an absorbent foam aggregate. Compartments 34 may be formed in abutting relationship or then can be separated as shown in FIG. 6 and joined by link 36 formed by outer layer 12. Link 36 may be dimensioned so as to add flexibility to surface wiping implement 10 and may be formed by bonding outer layer 12 so that compartments 34 are independent of each other (i.e., do not abut).

In any of the embodiments hereinbefore described, outer layer 12 may be made to have additional beneficial characteristics. For example, outer layer 12 may be made either wholly or partially to be abrasive using any of the techniques which are well known to those skilled in the art. An abrasive outer layer is one which will remove solid particles adhering to the surface being wiped. Such an abrasive outer layer is manufactured by General Cable Corporation of Brandon, Mississippi and marketed under the tradename Chore Ready.

What is claimed is:

1. A semi-disposable flexible wiping implement for removing liquid from surfaces comprising an absorbent core (14) having at least one outer surface and an outer layer (12) on at least one of said outer surfaces, said implement being capable of repetitive use cycles comprising a wiping step to absorb liquid followed by a compressive wringing step to expel liquid, characterized in that the absorbent core (14) has a minimum wicking rate of at least 12.7 cms/min and said outer layer (12) is substantially non-collapsible and has a Liquid Removal Index of from 8 to 100 mm/g, said Liquid Removal Index being defined by the term PT/39.37 R where P is the porosity index, T is the thickness of the outer layer in mm and R is the weight in grams of the liquid retained by the outer layer.

2. The surface wiping implement of claim 1 wherein said outer layer has a Liquid Removal Index of from about 25 to about 100 mm/gm.

3. The surface wiping implement of claim 1 wherein said outer layer has a Liquid Removal Index of from about 30 to about 50 mm/gm.

4. The surface wiping implement of claim 1 wherein said outer layer encases said absorbent core means.

5. The surface wiping implement of claim 1 wherein said outer layer is affixed to said absorbent core means.

6. The surface wiping implement of claim 1 wherein an intermediate layer means for improving lateral wicking is interposed between said outer layer and said absorbent core means.

7. The surface wiping implement of claim 1, wherein said intermediate layer means is bonded to said outer layer.

8. The surface wiping implement of claim 1 wherein said outer layer has a plurality of compartments containing said absorbent core means.

9. The surface wiping implement of claim 1, wherein said absorbent core means has a wicking rate of at least 25.4 cms/min.

10. The surface wiping implement of claim 1 or claim 9 wherein said absorbent core means has an absorbent capacity of at least 100 grams of water per 25 grams of absorbent material.

11. The surface wiping implement of claim 1 wherein said outer layer is a non-abrasive non-woven fabric made of 1-2 denier polypropylene fibers.

12. Th surface wiping implement of claim 1 wherein said outer layer is nonwoven polypropylene fabric made of non-abrasive 1-2 denier fibers.

* * * * *